May 11, 1954     J. W. WILLIAMSON     2,678,368
APPARATUS FOR HIGH-FREQUENCY INDUCTION SEAM WELDING
Filed May 25, 1951

INVENTOR.
JAMES W. WILLIAMSON
BY
*Alfred C. Body*
ATTORNEY

UNITED STATES PATENT OFFICE 2,678,368

APPARATUS FOR HIGH-FREQUENCY INDUCTION SEAM WELDING

James W. Williamson, Cleveland, Ohio, assignor to The Ohio Crankshaft Company, Cleveland, Ohio, a corporation of Ohio Application May 25, 1951, Serial No. 228,291

4 Claims. (Cl. 219—6)

This invention relates to the art of high-frequency induction seam welding and, more particularly, to the continuous welding of the edges of a longitudinally-split tube employing high-frequency induced currents to produce the welding heat.

The invention, in some respects, is an improvement on the method and apparatus for continuous seam welding described in British patent specification No. 377,655 filed January 21, 1931. In this patent specification, a longitudinally-split tube moves axially through a high-frequency induction coil with its edges in slightly-spaced relationship. The coil induces high-frequency voltages in the tube between the edges. As the tube leaves the coil, the edges are brought into abutting engagement, thus completing the electrical circuit and causing current to flow between the edges at the point where they are first brought into engagement. In this arrangement, the induced currents under the coil and circumferentially spaced from the edges flow circumferentially. Adjacent the edges, the currents turn and flow longitudinally in a rather wide path toward the point of contact of the edges. There is relatively no concentration of the longitudinal currents along the edges until just as the point of contact of the edges is reached. Thus, these longitudinally-flowing currents produce little or no heating effect. All of the heating is developed at the point of contact. As the amount of heat developed is a direct product of the rate of heat input times the time that the heat is applied, it will be seen that either unduly large amounts of power must be employed or relatively slow speeds of movement must be employed in order to allow the required amount of heat to be generated to raise the edges to the welding temperature.

The present invention contemplates means for concentrating the longitudinally-flowing currents in the edges themselves between the exit end of the coil and the point of initial contact of the edges so that a degree of preheating of the edges will result and the amount of heat which must be produced at the point of contact will be substantially reduced. In accordance with the invention, members of magnetically-permeable material are positioned in close-coupled magnetic relationship with the edges between at least the exit end of the coil and the initial point of contact of the edges. These members are relatively narrow and serve to increase the flux density of the current so that they will concentrate at the edges rather than to flow over a relatively wide area longitudinally of the tube.

The principal object of the invention is the provision of new and improved means for concentrating the longitudinally-flowing currents in the edges themselves between the exit end of the inductor and the point of initial contact of the edges.

Another object of the invention is the provision of new and improved means, including members of magnetically-permeable material having a high resistance in an axial direction of the tube, in close-spaced parallel relationship with the edges of the tube between the exit end of the coil and the point of initial contact of the edges.

The invention will be specifically set forth and defined in the claims appended to the end hereof. The invention is comprised in certain parts and arrangement of parts, a preferred embodiment of which will be described in detail in this specification and illustrated in the accompanying drawing which is a part hereof, and wherein:

Figure 2:
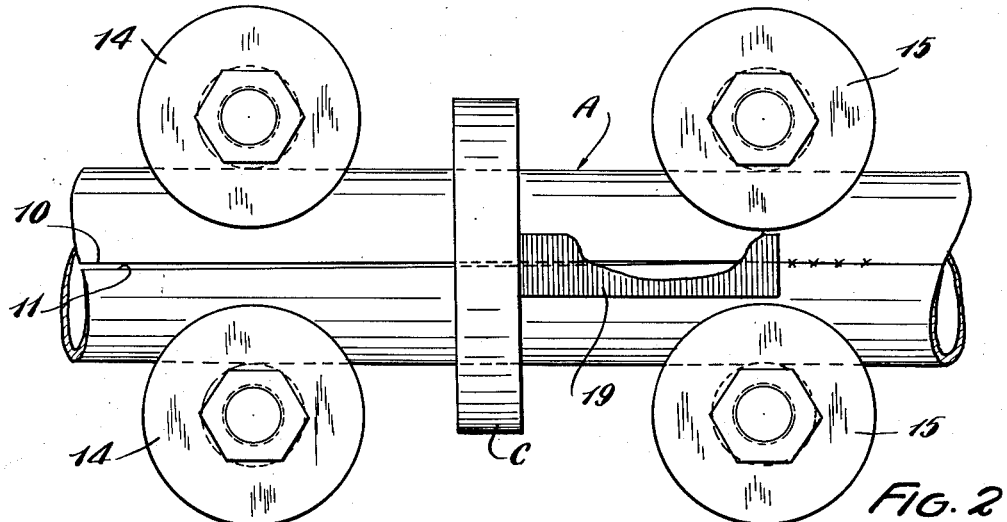
Figure 2 is a top elevational view of Figure 1 with parts broken away for the purposes of clarity.
Figure 1:
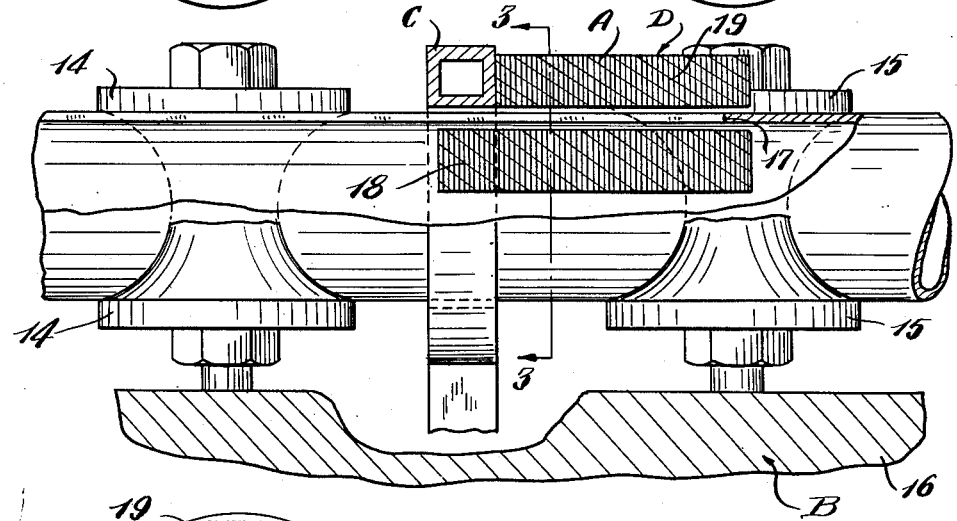
Figure 1 is a side elevational view partly in section of a continuous seam-welding machine using high-frequency induced currents for producing the welding heat embodying the present invention.
Figure 3:
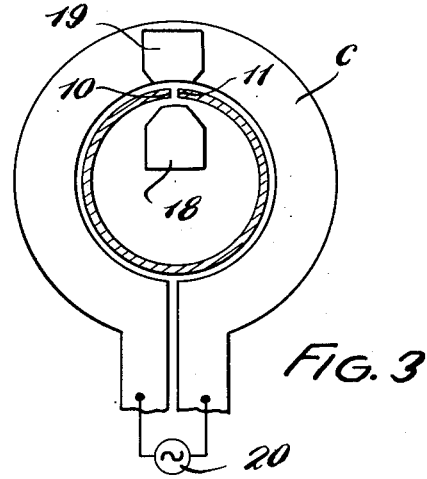
Figure 3 is a cross-sectional view of Figure 1 taken approximately on the line 3—3 thereof.

Referring now to the drawing wherein the showings are for the purposes of illustrating the invention only and not for the purposes of limiting it, the figures show a tube A having edges 10, 11 to be welded moving from left to right through a seam-welding machine B, including opposed pairs of forming rolls 14 and opposed pairs of welding rolls 15 mounted for rotation on a base 16. The edges 10, 11 leave the forming rolls 14 in slightly-spaced parallel relationship and are brought together at the point 17 by the welding rolls 15. A high-frequency inductor C energized from a suitable source of high-frequency energy 20 surrounds the tube A intermediate the rolls 14, 15 and, in particular, in advance of the point 17 where the edges 10, 11 are brought into abutting and electrical engagement. Means D extend in close-spaced parallel relationship with the edges 10, 11 between the exit end of the coil C and the point 17. These means serve to concentrate in the edges 10, 11 the flow of high-frequency currents flowing between the coil C and the point 17.

The tube A may be of any known or desired metallic material; such as, steel, copper, aluminum, stainless steel or the like, and may take any desired shape, although it is shown for the purposes of convenience in the figures as being round. The welding machine B is relatively conventional in construction and will not be further detailed here.

The coil C is shown as comprised of a single turn of high-conductivity material such as copper. It will be appreciated that the coil could be comprised of a plurality of turns such as is described in the above referred to British specification; or, if a single-turn coil is desired, the axial length thereof may be greater or less than that shown. The inductor C is shown as being of a hollow construction so that cooling water or the like can be circulated therethrough to remove the $I^2R$ losses in the inductor itself.

High-frequency currents flowing in the coil C generate a high-frequency magnetic flux field which links with the tube A under the inductor C and generates a voltage between the edges 10, 11. As the edges 10, 11 under the coil C are in spaced relationship, no currents can flow therebetween under the coil C. However, the high-frequency induced currents do flow from under the coil C longitudinally of the tube A and between the edges 10, 11 at the point 17. These currents are highly concentrated at the point 17 and generate rapidly large amounts of heat. Heretofore, the entire heating had to be developed at the point 17.

In accordance with the present invention, means are provided in close-coupled relationship to the edges 10, 11 between the exit end of the coil C and the point 17 for concentrating the currents which flow longitudinally of the tube in the edges 10, 11 so that these currents will produce a degree of heating in the edges 10, 11, thereby lowering the total amount of heat which must be generated at the point 17. In the embodiment shown, the means D comprise members 18, 19 of magnetic material having high electrical resistivity in a longitudinal direction of the tube A positioned internally and externally of the tube. These members may be comprised of powdered magnetic materials or of magnetic laminations having their plane transverse to the longitudinal length of the tube. Preferably, each lamination should have a thin film of insulation on the surface to prevent the longitudinal flow of current therethrough. As shown, the members 18, 19 are relatively narrow in a circumferential direction relative to the tube and the lower corners thereof are chamfered to further narrow the tube or edge-facing surface of the members. The member 18 is positioned internally of the tube A. The left or entrance end of the internal member 18, as shown, extends at least part way into the inductor C. The members 18, 19 may be mounted in any desired manner relative to the tube A so as to maintain the close spacing of the members with the edges 10, 11 and to maintain the longitudinal position thereof. Means for positioning the members are not shown as it is believed that they are fully within the skill of the art.

Also, in some instances, the members will develop relatively large amounts of internal heat due to eddy currents and the like and, if desired, suitable cooling means can be provided as is known in the art for magnetically-permeable material.

The effect of the members is to provide a high flux concentration along the edges between the exit end of the inductor C and the point 17 which forces the currents flowing longitudinally of the tube to be concentrated along the edges 10, 11. These currents flowing in a concentrated manner will heat the edges 10, 11 to an amount such that the amount of heat which must be developed at the point 17 is substantially reduced and thereby lower the over-all heat energy which must be supplied to the inductor C.

The invention has been particularly described with reference to a preferred embodiment thereof. It will be appreciated that modifications and alterations will occur to others upon a reading and understanding of this specification and it is my intention to include all such modifications insofar as they come within the scope of or are the equivalent of the appended claims.

Having thus described my invention, I claim:

1. In continuous seam-welding apparatus wherein a tube with longitudinally-split edges is continuously advanced along a predetermined path with its edges in spaced relationship and the edges are then brought into abutting and electrical engagement at a predetermined point in said path and a high-frequency inductor surrounds the tube in advance of the point where the edges are brought together, said inductor being of the type adapted to induce currents to flow circumferentially in the tube and between the edges, the improvement which comprises a narrow elongated member of magnetically-permeable material disposed between the exit end of the inducing means and the point of engagement of the edges in close-spaced parallel relationship with said edges.

2. Apparatus for continuously welding the longitudinally-spaced edges of a continuously-moving metallic tube, means for moving said edges into abutting electrical engagement at a predetermined point, high-frequency inducing means disposed in advance of said point about said tube and adapted to induce high-frequency currents to flow in said tube and between said edges at said point and magnetically-permeable means in close-spaced parallel relationship with said edges between said inducing means and said point.

3. The combination of claim 2 wherein said magnetically-permeable means comprise a stack of magnetic laminations having the plane thereof transverse to the axis of said tube.

4. Seam-welding apparatus for continuously welding the edges of a longitudinally-split tube comprising means for advancing said tube along a predetermined path, means for moving said edges into abutting electrical engagement at a predetermined point in said path, high-frequency inducing means encircling said path in advance of said point and a narrow stack of magnetic laminations extending in close-spaced parallel relationship with said edges between said inducing means and said point, both internally of and externally of said tube.

References Cited in the file of this patent

UNITED STATES PATENTS

| Number | Name | Date |
| --- | --- | --- |
| 1,842,461 | Sessions | Jan. 26, 1932 |
| 2,020,276 | Crawford | Nov. 5, 1935 |
| 2,086,305 | Sessions | July 6, 1937 |
| 2,181,445 | Adams, Jr. | Nov. 28, 1939 |

FOREIGN PATENTS

| Number | Country | Date |
| --- | --- | --- |
| 377,655 | Great Britain | Jan. 21, 1931 |